July 28, 1970   SHINJIRO MORI   3,521,701

RADIATOR UNIT FOR INDUSTRIAL SAFETY ILLUMINATING APPARATUS

Original Filed Dec. 18, 1967   4 Sheets-Sheet 1

SHINJIRO MORI,
INVENTOR.

BY Wenderoth, Lind & Ponack
ATTORNEYS

→ Sites on the surface of the illuminating apparatus are which the surface temperatures are measured.

SHINJIRO MORI,
INVENTOR

ATTORNEYS

United States Patent Office 3,521,701
Patented July 28, 1970

3,521,701
RADIATOR UNIT FOR INDUSTRIAL SAFETY
ILLUMINATING APPARATUS
Shinjiro Mori, Tokyo, Japan, assignor to Mori Denki
Manufacturing Co., Ltd., Tokyo, Japan, a Japanese
corporation
Continuation of application Ser. No. 691,574, Dec. 18,
1967. This application Sept. 10, 1969, Ser. No. 861,216
Claims priority, application Japan, Aug. 3, 1967
(utility model), 42/67,047
Int. Cl. F24h 3/00
U.S. Cl. 165—47          5 Claims

ABSTRACT OF THE DISCLOSURE

A radiator unit for industrial safety illuminating apparatuses, comprising an enclosure-type body having, on the exernal peripheral wall face thereof, a plurality of radiator pipes each extending in the direction of the radius of said wall.

---

This application is a continuation of Ser. No. 691,574 filed Dec. 18, 1967 and now abandoned.

BACKGROUND OF THE INVENTION

Field of the invention

Unlike ordinary electric lamps, industrial safety illuminating apparatuses are used for an extended period of time under severe conditions and environment in hazardous locations such, for example, as mines, ships, warehouses, explosives manufacturing factories, petroleum refining factories and chemical plants. Because industrial safety illuminating apparatuses are installed in hazardous places as stated above, they are naturally required to be insured of their safety against all hazardous conditions. To this end, it is mandatory that their casings which cover incandescent lamps be of an enclosure-type structure. However, industrial safety illuminating apparatuses of the prior art had the shortcomings that, owing to said enclosure-type structure of the casings intended for the protection of the lamps, the temperature of the atmosphere contained in the enclosed space of such a casing and surrounding the lamp tended to increase to such a high degree that the illuminating apparatus assembly itself was heated up, with the result that the life of the lamp was undesirably reduced. Thus, the lamps of the illuminating apparatuses of the prior art tended to burn out and become unusable after a relatively short period of time and, therefore, the operators were often obliged to replace them.

However, since industrial safety illuminating apparatuses are used, in general, in those special facilities as described above, and in addition, because they are installed mostly at either high places or difficult sites to reach, the replacement of the burnt-out lamps was costly. In many cases, this cost of replacement of a lamp amounted to several times the cost of the lamp per se, and such a replacement, unlike the replacement operation of an ordinary lamp, required a great deal of labor and time. Thus, the industrial safety illuminating apparatuses of the prior art were not economical in all aspects. It is for the foregoing reasons that the prolongment of the life of the bulbs of industrial safety illuminating apparatuses has been much sought after.

Description of the prior art

In order to meet the demand for prolongment of the lives of lamps for use in industrial safety illuminating apparatuses, there have been made proposals to provide a radiator device such as air-passageways or radiator panels for each type of industrial safety illuminating apparatuses. However, none of these prior techniques have successfully eliminated the shortcomings and problems of the industrial safety illuminating apparatuses which the present invention intends to solve. More specifically, the provision of air-passageways is not suitable for industrial safety illuminating apparatuses which require complete enclosure of the lamps, while the radiator panels are good only for increasing the radiating area to a limited extent, but no marked effect of heat radiation can be expected therefrom.

SUMMARY OF THE INVENTION

It is, therefore, the primary object of the present invention to perfectly satisfy the afore-described specific requirements of industrial safety illuminating apparatuses, by the provision of a radiator unit having a plurality of radiator pipes extending radially on the external peripheral wall face of said unit of the enclosure type.

Another object of the present invention is to provide a radiator unit for industrial safety illuminating apparatuses which is capable of quickly radiating the heat generated in the illuminating apparatus provided with the radiator unit and which, accordingly, serves to prolong the life of the lamp mounted within said apparatus.

Still another object of the present invention is to provide a radiator unit for industrial safety illuminating apparatuses which is capable of further enhancing the safety of the illuminating apparatus per se by preventing an excessive elevation of the temperature of the illuminating apparatus which is caused by the heat generated from the bulb contained therein.

A further object of the present invention is to provide a radiator unit for industrial safety illuminating apparatuses which can reduce the cost of replacement of the lamp, by prolonging the life of the lamp through effective radiation of the generated heat.

Other objects, features and attendant advantages of the present invention will become apparent by reading the following detailed description in conjunction with the accompanying drawings.

DESCRIPTION OF THE PREFERRED EMBODIMENTS

Figure 1:
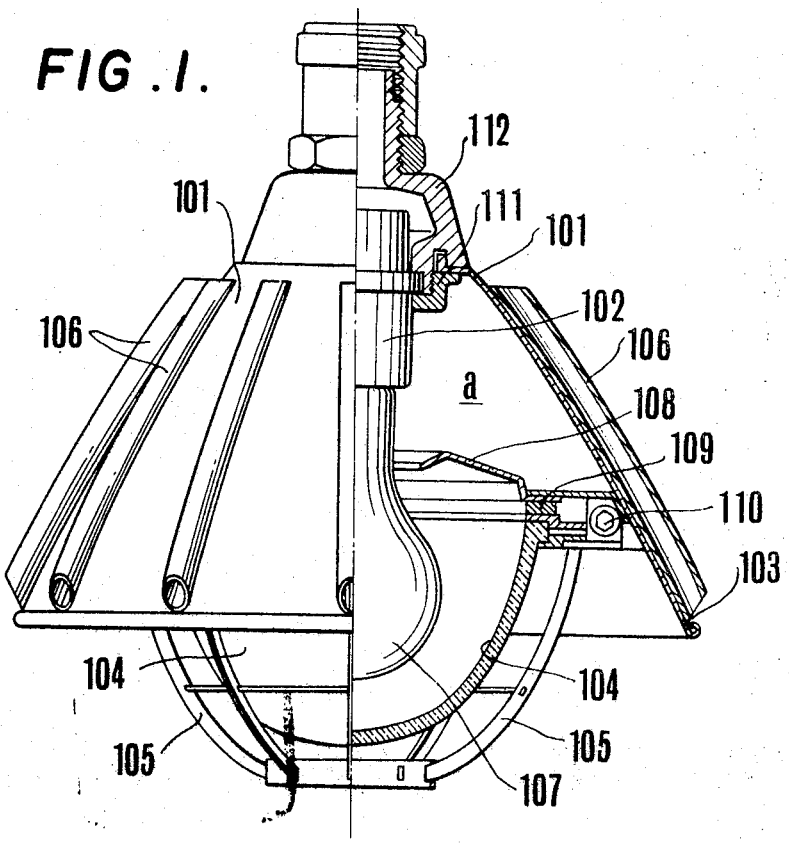
FIG. 1 is a side elevational view, with parts broken away, of an industrial safety illuminating apparatus provided with a radiator unit embodying the present invention.
Figure 2:
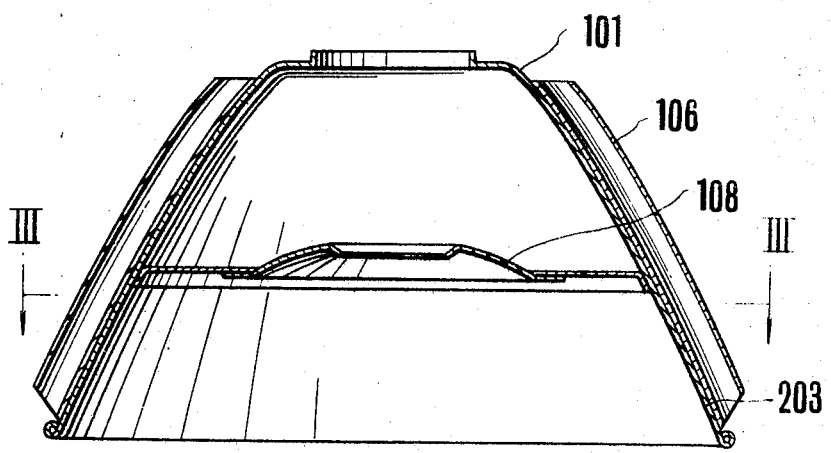
FIG. 2 is a longitudinal sectional elevation of the radiator unit of FIG. 1, taken along the center line thereof.
Figure 3:
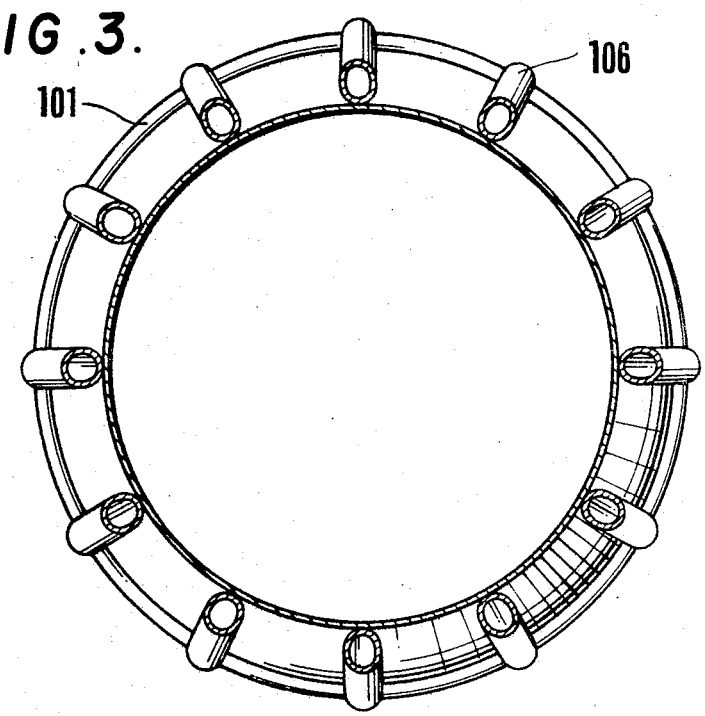
FIG. 3 is a cross sectional view of the device shown in FIG. 2, taken along the line III—III.
Figure 6:
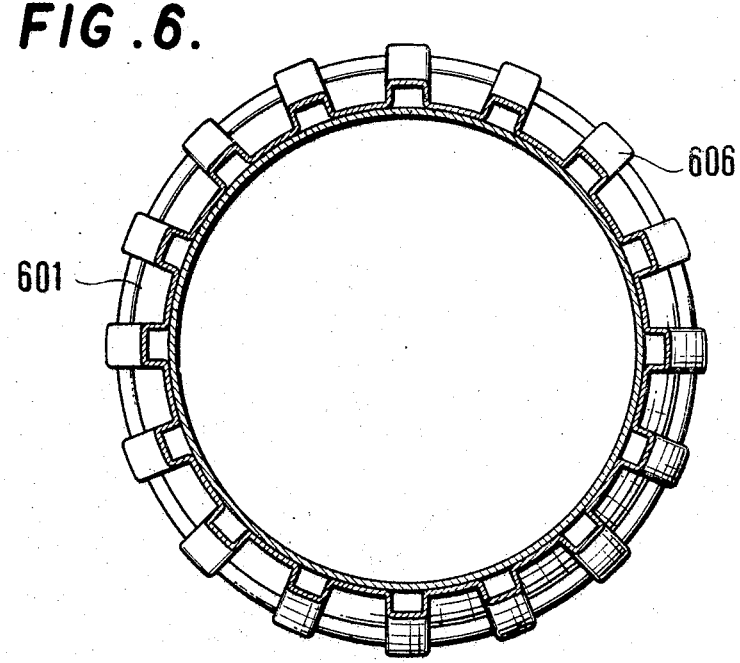
FIG. 6 and FIG. 7 are cross sectional views similar to FIG. 3 and respectively show a metal plate in the form of a shade having an uneven surface configuration or ridges.
Figure 7:
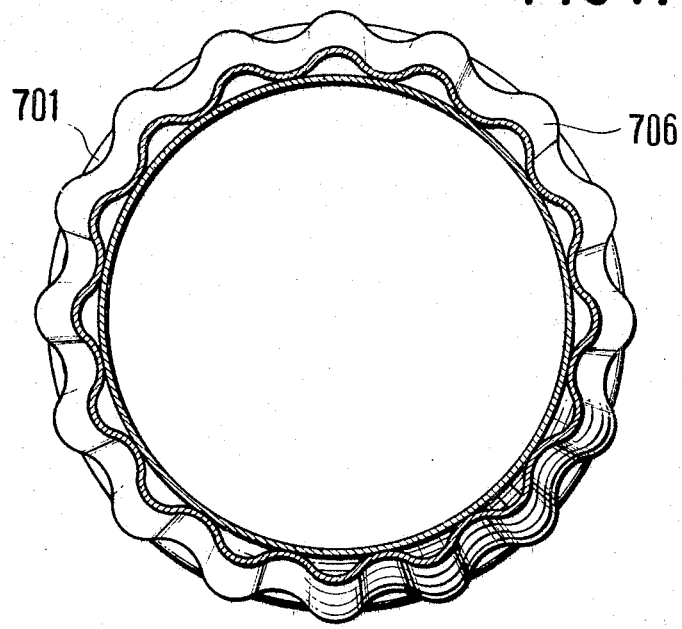

In FIGS. 1-3 of the drawings, reference numeral 101 represents, in general, the body of the radiator unit of the present invention for use in industrial safety illuminating apparatuses. In the inner side of this body 101 is provided a socket 102, and in the lower section of the body of the unit is provided a shade member 103. Numeral 104 represents a globe which is provided on the inner side of the shade member 103 for enclosing the lower inner area of the body 101 and there is also provided a protective frame 105 mounted in such a way as to surround said globe. Numeral 106 represents a radiator pipe a plurality of which is provided securely attached to the external peripheral wall face of the body 101 so as to extend in the directions of the radii of said face. Numeral 107 represents an incandescent lamp mounted in said socket for engagement therewith. Numeral 108 represents a reflecting shade. At the annular-shaped portion of the globe 104 where the latter is in contact with the shade member 103, there is securely attached an annular packing 109 in such fashion that by tightening, by the use of a known screw-clamping means or a latching means (neither of which are shown), the protective frame 105 mounted on a hinge means 110 attached securely to the shade member 103, said globe 104 is urged to effect the enclosing of the lower inner area of the body 101 in an air-tight fashion by virtue of said packing 109. The upper inner area of the body 101, on the other hand, is adapted to be enclosed likewise by shoulder portions 111 and 112 which are in threadable engagement to each other for positively holding said socket 102 and the upper end portion of the body 101 by engagingly surrounding them. As shown in FIGS. 2 and 3 the radiator pipes 106 are disposed on the external face of the peripheral wall so as to extend radially thereof, said peripheral wall comprising the shade member 103 which is provided in the lower section, and the body 101 of the radiator unit which is located in the upper section of the wall. It is necessary to provide at least about a dozen radiator pipes 106. A number of radiator pipes greater than that will bring about a better heat radiating effect. The body 101 of the radiator unit and the shade member 103 which constitute said external peripheral wall face are formed of a metal material such as aluminium, stainless steel or iron which has good heat conductivity, and the radiator pipes 106 which are securely provided thereon are also manufactured of a similar material. The radiator pipes 106 are welded directly onto said external peripheral wall face. Or alternatively, in lieu of providing radiator pipes, there may be employed as shown in FIGS. 6 and 7 a corrugated metal plate 606 or 607 in the form of a lamp shade, engagingly mounted on said external peripheral wall face of shade members 601 or 701 or may be securely attached thereto by a known welding technique.

Figure 4:
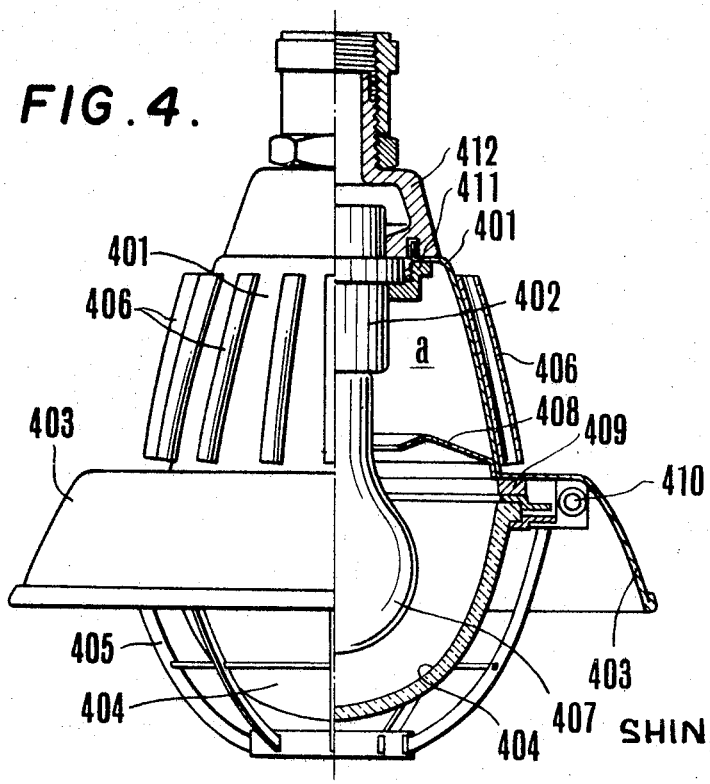
FIG. 4 is a longitudinal sectional view, with parts broken away, which is similar to FIG. 1, showing a modified example of the radiator unit of the present invention.

FIG. 4 shows a further embodiment of this invention. All the parts of radiator unit in the FIG. 4 are substantially the same as the corresponding parts shown in FIG. 1, excepting the body, shade member and radiator pipes, and these like parts are indicated by corresponding reference numerals, e.g. 104 and 404. Accordingly, only the different parts in FIG. 4 need be described.

Reference numeral 401 represents the smaller slightly flared body of the radiator unit of the embodiment of the present invention. At the lower portion of body is an outwardly curved shade member 403 for easily accommodating the globe 404 therein. The embodiment, therefore, has an outside appearance of a flaring shape comprising large and small flaring parts.

The radiator pipes 406 are securely attached to the external peripheral wall face of the small flaring part of the body 401 so as to extend in the directions of the radii of the said face.

Description will next be directed to the radiating function of the radiator unit of the present invention.

Figure 5:
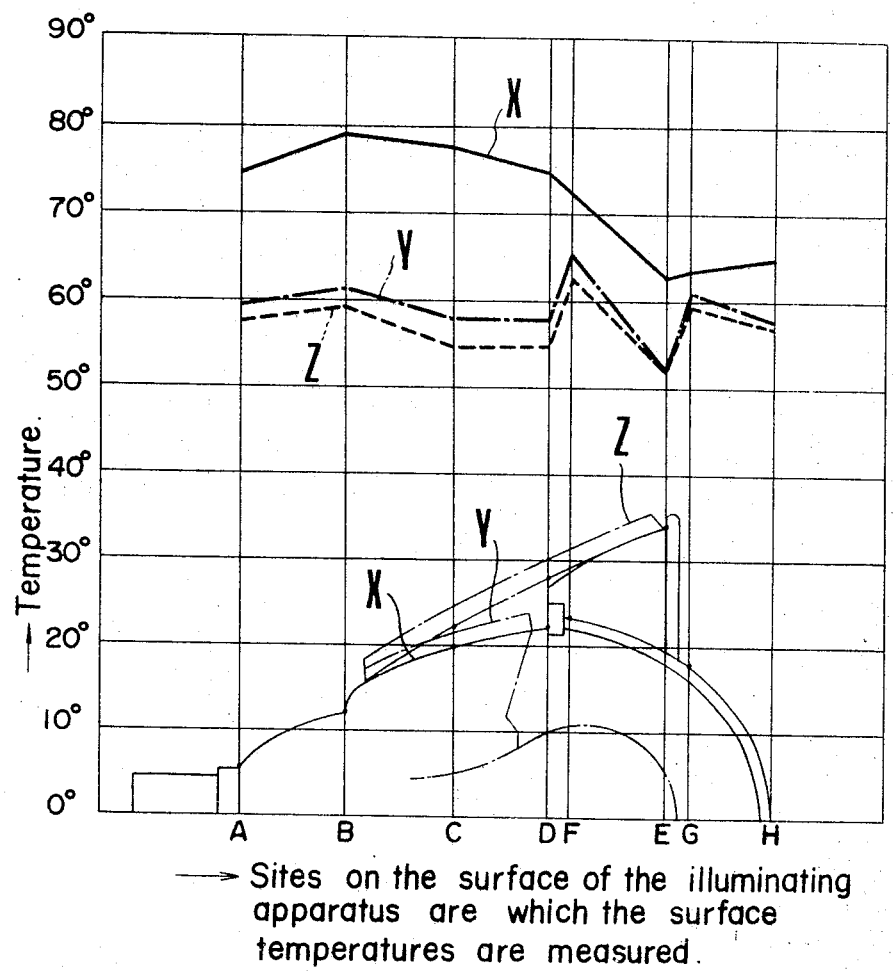
FIG. 5 is a diagram for comparison of the surface temperatures of three types of industrial safety illuminating apparatuses, one of which is not provided with a radiator unit of the present invention, the other two being provided with the radiator units of the types as shown in FIG. 1 and FIG. 4, respectively.

When the incandescent lamp 107 is lighted up, the heat generated from said lamp first heats up the globe 104 and then the heat is transmitted upwardly through the reflecting shade 108 and into the space *a* located in the upper area inside the body 101 to heat up the body itself. Because the radiator pipes 106 are provided on the external peripheral wall face of the body so as to extend radially thereof, the air located in the radiator pipes 106 is heated up and, accordingly, the heated air is allowed to ascend upwardly through the radiator pipes to be discharged into the atmosphere from the open upper ends of the pipes. With this displacement of the air contained in the radiator pipes from the lower section to the upper section thereof, there is created up-going air currents in these radiator pipes 106, and this is accompanied by the entry of fresh cool air into the pipes 106 through the open ends thereof, causing the effect of air streams to take place. By virtue of this effect of air streams, the radiator pipes 106 perform heat-radiating operations, with the result that the temperatures in the interior space defined by the body 101 and in the space located on the inner side of the shade member 103 are lowered. The radiating function of the radiator unit as shown in FIG. 4 is made up of two parts, one the function of the air streams through the pipes 406 and the other the natural radiating function of shade member 403. The radiation of heat is accomplished in this way. The degree of the actual elevation of the temperature of the illuminating apparatus as the result of the provision of radiator pipes is shown in FIG. 5. In FIG. 5, Type X represents an industrial safety illuminating apparatus which is not provided with radiator pipes. Type Y represents an industrial safety illuminating apparatus which is provided, on only the body section 401, with radiator pipes as illustrated in FIG. 4. Type Z represents an industrial safety illuminating apparatus which is provided with radiator pipes extending on the peripheral wall face radially for a relatively substantial length covering both the body section 101 and the shade section 103, as shown in FIG. 3. The radiator pipes of the illuminating apparatuses of Types Y and Z have an inner diameter of 10 mm., and the 100 watt incandescent lamps of the respective illuminating apparatuses of said three types were equally lighted up when the room temperature was 30° C. The surface temperature of each of these three types of illuminating apparatuses was measured at eight points on the apparatus. The symbol A represents the point corresponding to the portion above the shoulder portion 112. The symbol B represents a point corresponding to the upper end of the body 101. The symbol C represents a point corresponding to an intermediate part of the body 101. The symbols D and F represent the points corresponding to the upper end portion of the shade member 103. The symbol E represents a point corresponding to the lower open end of a radiator pipe. The symbol G represents a point corresponding to the lower end of the shade member 103, and the symbol H represents a point corresponding to the globe section 104 immediately below the lamp.

As has been described, according to the present invention, there is provided a radiator unit having a plurality of radiator pipes disposed on the external peripheral wall face so as to extend radially thereof not only on the body section 101 where the degree of elevation of temperature is maximum throughout the industrial safety illuminating apparatus structure, but also on the shade member 103, and therefore, the elevated temperature of the air located in the space in the upper portion on the inner side *a* of the body 101 causes the occurrence of an ascending air current in each of the radiator pipes 106. The air streams which are produced in this way act so as to coercively radiate the heat which is generated in the space located on the inner side of the body 101, and as a result, a highly effective heat radiation is accomplished.

What is claimed is:

1. A radiator unit for industrial safety illuminating apparatuses, comprising an imperforate reflector body having at least a part having a substantially truncated conical shape with an acute angle between the cone axis and the cone surface and having a plurality of imperforate open-ended radiator pipes attached to the external peripheral wall face of said truncated conical shape part of said body substantially along generatricies thereof, said body having an enclosure type inner structure, whereby when the cone axis is vertical said pipes extend in a generally vertical direction along said external peripheral wall face.

2. A radiator unit as claimed in claim 1 in which said radiator pipes are of a metal having good heat conductivity.

3. A radiator unit as claimed in claim 1 in which said radiator pipes are welded directly to the external wall face of said body.

4. A radiator unit as claimed in claim 1 in which said part of said body consists of a smaller slightly flared body portion and said body further has a larger shade member on the lower end thereof, said pipes extending substantially vertically on the external peripheral wall face of said body portion.

5. A radiator unit for industrial safety illuminating apparatuses, comprising an imperforate reflector body having at least a part having a substantially truncated conical shape with an acute angle between the cone axis and the cone surface, an imperforate metal plate having corrugations therein mounted on the external peripheral wall face of said truncated conical shape part of said body with said corrugations extending substantially along generatricies of said body part to define open ended elongated spaces along the generatricies of said body part, said body having an enclosure type inner structure, whereby when the cone axis is vertical said elongated spaces extend in a generally vertical direction along said external peripheral wall face.

References Cited

UNITED STATES PATENTS

| 2,282,587 | 5/1942 | Kurth | 240—47 |
| 2,831,104 | 4/1958 | Brandt | 240—47 |
| 3,231,011 | 1/1966 | Shenuski | 165—80 |

ROBERT A. O'LEARY, Primary Examiner

C. SUKALO, Assistant Examiner

U.S. Cl. X.R.

240—47